F. W. WALTERS.
SUBMARINE ARMOR.
APPLICATION FILED MAY 21, 1919.
1,359,132.
Patented Nov. 16, 1920.
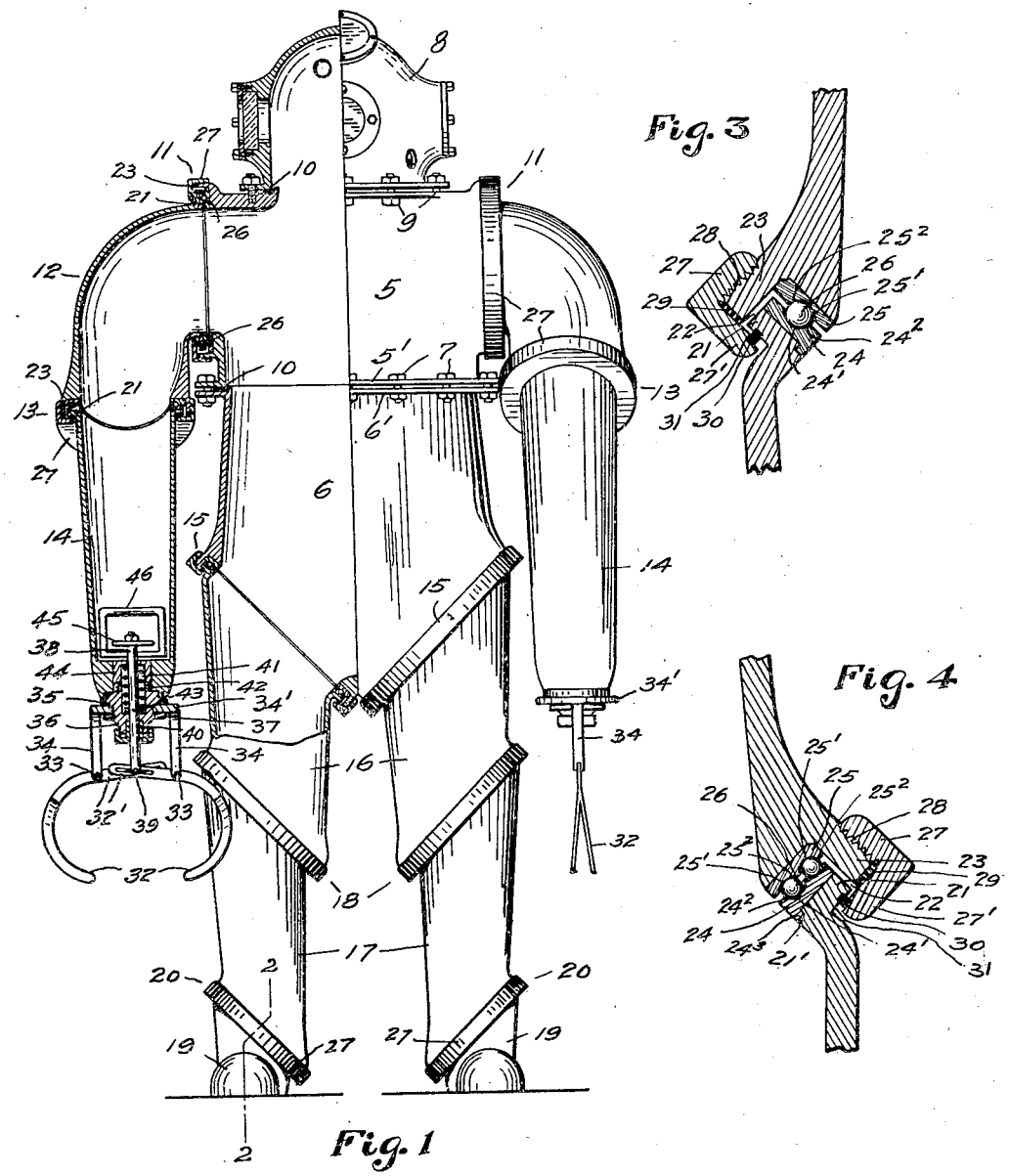
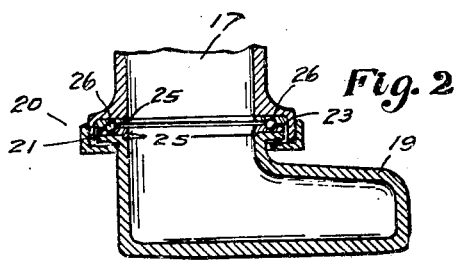
INVENTOR:
Frank W. Walters
BY
Pierre Barnes
ATTORNEY

UNITED STATES PATENT OFFICE.

FRANK W. WALTERS, OF VANCOUVER, BRITISH COLUMBIA, CANADA.

SUBMARINE ARMOR.

1,359,132.  Specification of Letters Patent.  Patented Nov. 16, 1920.

Application filed May 21, 1919. Serial No. 298,722.

*To all whom it may concern:*

Be it known that I, FRANK W. WALTERS, a subject of the King of England, residing at Vancouver, in the Province of British Columbia, Canada, have invented certain new and useful Improvements in Submarine Armor, of which the following is a specification.

This invention relates to diver's armor, and its object is to improve devices of this character to render the same more efficient and convenient to use in deep water operation.

With these ends in view the invention consists in the novel construction, adaptation and combination of parts as will be hereinafter described and claimed.

In the accompanying drawings, Figure 1 is a front elevational view, shown partly in section, of a suit of diving armor embodying my improvements. Fig. 2 is a side elevational view of a portion of one of the leg members. Fig. 3 is a detail sectional view of the joint device shown in Fig. 1. Fig. 4 is a view similar to Fig. 3 showing a modification.

In carrying out my invention I provide a metal suit having a trunk divided into two superposed members 5 and 6 separably secured together by bolts 7 passing through apertured flanges $5^1$ and $6^1$.

A helmet 8 is, in like manner, secured to the upper trunk member 5 by bolts 9. The connections between said members are rigid and to preclude the passage of water therethrough I provide the same with suitable gaskets 10.

Connected by a shoulder joint 11 to each side of the trunk member 5 for longitudinal swinging movements is an upper arm 12 which, in turn, is connected by an elbow joint 13 with lower arm member 14. The elbow joint 13 in the present invention is disposed diagonally to the axis of the arm so as to afford lateral swinging movements to the lower arm member.

Connected to the bottom of the lower trunk member by thigh joints 15 are legs, each comprising two members 16 and 17 connected by a knee joint 18 and a foot 19 is connected with the adjacent member 17 by means of an ankle joint 20.

The various aforesaid joints are each constituted of a peripheral flange 21, provided at the end of one of the associated parts or members, being inserted within an annular recess 22 provided in a circular boss 23 of the complementary member.

Seated against the flange 21 and the inner end of the recess 22, respectively, are bearing rings 24 and 25 having opposing grooves $24^1$ and $25^1$ (Figs. 3 and 4) which serve as ways for series of antifriction balls 26.

In Figs. 1, 2 and 3, I show one pair of grooves for a corresponding series of balls, which is preferable where the armor is to be used at moderate depths as, for example, thirty fathoms; but at relatively greater depths, a plurality of pairs of grooves (Fig. 4) are desirably provided in the bearing rings to accommodate a corresponding greater number of balls for the purpose of better withstanding relatively high pressures of water acting against a joint.

To facilitate the assembling of the ball bearings and also afford more ring bearing surfaces for the balls the inner and outer peripheral surface of the grooves $24^1$ and $25^1$ are preferably extended to provide shoulders $24^2$ and $25^2$ (Fig. 3) disposed in angular relation to the axis of rotation of a joint. A bearing ring 25, moreover, is fitted against the outer peripheral surface of a recess 22, and a ring 24 is provided with an annular rib $24^3$ fitting into a rabbet $21^1$ in the end of the associated member, whereby the rings are maintained against displacement at right angles to their respective axes.

The complementary members at each joint are coupled for relative rotary movements by means of a union nut 27 engaging external screw threads 28 upon the respective boss 23 and having an inwardly directed portion $27^1$ extending over the flange 21 of a joint. 29 represent packing rings interposed between the ends of the respective bosses and the nut portions $27^1$, and 30 represent packing rings between such portions and the outer faces of the flanges 21.

The packing rings 30, as best shown in Figs. 3 and 4, are retained concentrically of the axis of the joints by the provision of annular abutments 31 opposing the direction of pressures of water acting against the respective packing rings.

Included in the invention are artificial hands connected to and extending from the arm members 14. Each of said hands consists of a pair of bifurcated gripping lever elements 32 fulcrumed at 33 to arms 34 depending from an annular plate $34^1$ rotatable about the neck 35 of an extension 36 of an arm and held in place by a nut 37 engaging a screw thread provided on said neck. 38 represents a pull rod having a forked lower end which is operatively-connected to the arms 32¹ of the aforesaid lever elements by means of a pin 39 extending through slots provided in said arms.

The pull rod 38 extends through a stuffing box 40 provided in the end of the extension 36 and thence through a chamber 41 of the latter into the space within the respective arm member 14. 42 represents a helical spring surrounding the rod 38 within said chamber and acting between a collar 43 secured to the rod and the end of a cap 44 which is rigidly secured to the extension 36. The spring 42 serves to push the rod 38 outwardly for the purpose of yieldingly retaining the bifurcated arm or fingers 32 in their distended relations.

To cause said fingers to be drawn toward each other, as when an object is to be grasped thereby, the operator pulls the rod 38 inwardly through the instrumentality of a transverse handle bar 45 rigidly secured to said rod.

The handle bar 45 is furthermore utilized for the purpose of rotating the artificial hand about the axis of the rod 38. For the convenience of the operator, a frame 46 seated against the bottom of the cavity in arm 14 is advantageously employed as a rest upon which he places the palm of his hand when actuating said rod.

The construction and operation of my improved diver's armor will, it is thought, be understood from the foregoing description.

I do not wish, however, to be understood as limiting myself to the specific illustrated structures and details thereof, as changes may be made therefrom without departing from the spirit of the invention within the scope of the appended claim.

What I claim, is—

A submarine armor having relatively movable arm and leg members connected by joints, each of said joints comprising a recessed boss provided with exterior screw threads on one of the members, a peripheral flange provided on the associated member and extending into said recess, annularly grooved rings seated against the opposing faces of the two members and within said recess, engaging shoulders formed on the contacting faces of the rings and said two members, bearing balls interposed between said rings and positioned in the respective grooves thereof, a union nut engaging the threads of said boss, said nut having a flange element extending over the peripheral flange of the referred to member and inclosing the same within said recess, and packing rings provided between the nut flange and the boss and flange of the respective members.

Signed at Seattle, this 6th day of May, 1919.

FRANK W. WALTERS.

Witnesses:
 PIERRE BARNES,
 EDITH WALKER.